United States Patent Office 2,912,428
Patented Nov. 10, 1959

2,912,428

PROCESS FOR THE MANUFACTURE OF AZO PIGMENTS

Hans Gaertner, Basel, and Henri Streiff, Birsfelden, Switzerland, assignors to Ciba Limited, Basel, Switzerland, a Swiss firm No Drawing. Application March 4, 1957
Serial No. 643,506

Claims priority, application Switzerland March 7, 1956

10 Claims. (Cl. 260—152)

It is known that in the normal aqueous coupling of diazo compounds without water-solubilizing groups with azo components, which also have no water-solubilizing groups, unequal results are very often obtained as regards yield, purity or shade. In some cases it is necessary to carry out the coupling, for example, in very dilute solution, which is disadvantageous from a technical point of view. It has also been suggested to add dispersing agents and wetting agents, protective colloids and/or agents having a similar effect, to the solution of the azo component or the reaction mixture.

It is also known that diazo compounds without solubilizing groups can hardly be made to couple twice with azo components, capable of being coupled twice and not containing solubilizing groups either (the phenolic hydroxyl groups bringing about coupling being generally not considered as solubilizing groups, because their effect disappears in the azo pigment) according to standard methods.

The aim of the present invention is, inter alia, to overcome these drawbacks.

The present invention is based on the observation that azo pigments from diazo compounds and azo components, which are both free from sulfonic acid groups, can be advantageously produced if the coupling is carried out under practically anhydrous conditions, in the presence of an organic vehicle, at high rates of concentration and with mechanical mixing.

Such reaction mixtures are obtained with advantage from diazo compounds as can easily be isolated directly, such as the sulfate of diazo-α-anthraquinone. This as well as other sparingly soluble salts or double salts of diazo compounds, which occur as moist press cakes, can be used provided it is possible to remove the remaining water content by adding water-binding agents. As sparingly soluble salts of diazo compounds there come into consideration, for example, salts with naphthalene-mono- and disulfonic acids, e.g. naphthalene-1-sulfonic acid and naphthalene-1,5-disulfonic acid, and as double salts, for example, the well known zinc chloride double salts. For the elimination of the remaining water content, it is of advantage to use dehydrated or partially dehydrated inorganic salts having a water-binding character, such as aluminum sulfate. The manufacture of such dry and relatively stable diazo compounds is generally known and needs no explanation.

The azo components can usually be prepared in anhydrous form without any difficulty. They may, for example, contain a couplable ketomethylene group in an open chain, as is the case in acylacetyl compounds, for example acetoacetyl- or benzoylacetyl compounds, or a couplable ketomethylene compound can also be present in a heterocyclic ring, for example in a pyrazolone ring or in a barbituric acid ring. An important group of azo components contains the 2-hydroxy-naphthalene-3-carboxylic acid grouping. Generally speaking, it is of advantage to use those diazo and azo components which are usually used for the production of ice colors.

According to the present invention it is also possible to produce those azo pigments which are formed by double coupling, using azo components capable of coupling twice. The azo components of this kind can also belong to the above mentioned groups, such as for example 4,4'-(acetoacetylamino)-3,3'-dimethyl - 1,1' - diphenyl, terephthaloyldiacetic acid-di(ortho-chlorophenylamide) of the formula

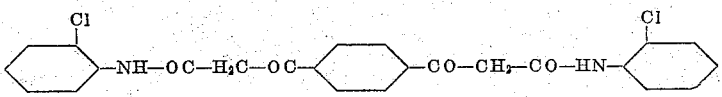

4,4'-di-(2"-hydroxy-3"-naphthoylamino)-1,1' - diphenyl and the corresponding products substituted in 3,3'-position by chlorine atoms or methoxy groups, 1,5-di-(2'-hydroxy-3'-naphthoylamino)-amino - naphthalene, 1,4-di-(2'-hydroxycarbazole-3'-carboylamino)-benzene and 4,4'-di - (3" - hydroxydiphenylene - oxide - 2" - carboylamino)-1,1'-diphenyl.

For the preparation of the reaction batches an azo component without sulfonic acid groups can, for example, be mixed with an organic solvent such as pyridine, ethylene glycol, polyethylene glycol or their ethers, dimethyl formamide, chlorobenzene or ortho-dichlorobenzene, until a difficultly kneadable or an easily kneadable mass is formed. If the solvent has not any acid-binding properties itself, an acid-binding agent, for example, sodium acetate, an alkali hydroxide, an alkaline earth hydroxide or another alkaline substance which preferably does not produce foam can be added. By the addition of a stabilized diazo compound the coupling can be started, care being taken that the reaction batch always remains kneadable by further addition of a solvent.

When an agent which is not acid-binding per se is used, such as ethylene glycol, a mixture of azo components and stabilized diazo compound can be worked up to a kneadable batch. Coupling can be started in this case by slowly adding an acid-binding agent, for example an alkali hydroxide. When this method is used, the volume of the kneaded mass only changes a little in the course of the reaction.

Coupling is advantageously carried out at relatively low temperatures of about 10 to 30° C.; for this purpose the kneading apparatus is intensively cooled, for example, with the aid of ice water, because heat is produced by the kneading, which, if inadequately drawn off, would increase the temperature too much.

The mechanical treatment can be carried out according to the present process in an apparatus of known construction which is adapted for intensive mechanical working up of relatively tough media, such as for example a mixer, a roller mill and particularly, a kneading apparatus of the Werner-Pfleiderer type.

After the coupling reaction is complete, the coupling mass can be treated with water, acid and/or alkaline agents to remove the assistants added for the coupling, such as pyridine, or the by-products, such as salts.

The present process, as mentioned above, is suitable for the production of all pigments without sulfonic acid groups in a simple and rapid manner in a very small space and using a minimum quantity of solvent, such as is necessary to obtain a kneadable mass. Coupling is generally very rapid. For example, azo dyestuffs can be prepared which have a free carboxylic acid group and serve as intermediates in which the carboxylic acid group is converted into the carboxylic acid halide group, and which are then worked up to final products, for example, aryl amides or esters.

According to the present process, it is also possible to carry out readily reproducible couplings with good yields which can otherwise only be carried out with difficulty or incompletely or unreliably.

Inasmuch as the desired pigments are formed directly according to the present process, they are in some cases in an unfavorable or even practically useless form for pigment purposes, distinguished by a characteristic X-ray diagram. This form of the dyestuff, which will be called α-form hereinafter, can be converted according to the invention into a form which is useful as pigment dyestuff, called β-form hereinafter, the latter showing a typically changed X-ray diagram.

For the preparation of the β-modification, the dyestuffs are advantageously treated with an organic solvent. As solvents there are used more especially high-boiling organic liquids which belong to many different classes of substances and which may also be miscible with water, such as, for example, the class of the amides, amines, esters or lactones, hydrocarbons, hydrogen halides or nitro derivatives of hydrocarbons. It is of advantage to use aromatic solvents such as aniline, xylene, but preferably nitrobenzenes, mono-, di- or trichlorobenzenes, α-chloronaphthalene or mixtures thereof.

The dyestuffs are advantageously treated with the above solvents at raised temperatures, generally at a temperature above 100° C. The quantity of the solvent to be used can vary within very wide limits. If desired, enough solvent is used to dissolve the dyestuff, the solution is then heated for some time, if necessary until the dyestuff is completely dissolved, at the desired temperature, usually between 110 and about 180° C., if necessary under pressure, and then allowed to cool. As a rule, however, heating with a very small quantity of an aromatic compound, such as nitrobenzene, ortho-dichlorobenzene or α-chloronaphthalene, for a short time is sufficient to effect conversion. A larger quantity of the solvent can be used if a purifying effect is desired.

The pigments obtained are worked up according to conventional methods by removing the solvent used, for example by centrifuging, distilling or washing or by simple filtration. The resulting pigments can be dispersed in inorganic or organic media, in masses or preparations from various plastics such as polyvinyl chloride-foils, lacquers, spinning solutions. They yield valuable dyeings which, in many cases have better shades from the point of view of color and better fastness properties than those which can be obtained with the corresponding untreated dyestuffs.

The following examples illustrate the invention, the parts being by weight unless otherwise stated. 1 mol means, as is usual, the number of grams corresponding to the molecular weight.

*Example 1*

A small kneading apparatus of the Werner-Pfleiderer type is charged with 0.05 mol of 3,3'-dichloro-4,4'-di-(2''-hydroxy-3''-naphthoylamino)-1,1'-diphenyl and 20 cc. of pyridine. A plastic, fairly hard mass is formed which is kneaded for half an hour, the kneading apparatus being covered by a glass plate and cooled by ice water circulating in its double jacket.

Whilst the kneading apparatus is running and continuous cooling with ice water is being carried on, there is sprinkled into the kneading mass in small portions in the course of 1½ hours 0.1 mol of diazotized 1-amino-3-chlorobenzene in the form of its zinc chloride double salt, which has been adjusted to a content of 42.7% calculated on free base by adding dehydrated aluminum sulfate. Coupling takes place very rapidly after each addition of diazo compound and without any evolution of nitrogen being observed in the mass. Only after about 90% of the total quantity of the diazo compound has been added, can a small excess of diazo compound in the kneading mass be detected for a few minutes after each further addition. Whilst the diazo compound is being added, the kneading mass becomes drier and harder with continuous formation of the dyestuff. By the gradual addition of a total quantity of 40 cc. of pyridine during coupling the consistency of the kneading mass is kept tough and plastic and rather hard suitable to attain an intensive kneading effect. After the last addition of diazo compound, kneading is carried on for half an hour. During the whole process the temperature in the kneading mass is about 20° C.

The kneading mass is stirred in succession in water, 2 N-hydrochloric acid and 0.2 N-sodium hydroxide solution, filtered and washed with hot water each time, and the filter cake which is finally obtained is dried in vacuo at 70° C. and pulverized. About 38 grams of the α-form of the disazo dyestuff are obtained.

The α-form of the dyestuff so obtained is a bright red powder in appearance consisting of irregularly formed lamellae which by transmitted light in the microscope have an orange color. When incorporated in polyvinyl chloride a foil is obtained which is orange colored by diffused reflected light and transmitted light and has poor fastness to migration.

1 gram of the powder obtained is heated with 100 cc. of ortho-dichlorobenzene for 5 minutes at the boil and then allowed to cool slowly. The fine crystalline precipitate which is formed is filtered off, washed with methanol, dried and pulverized. The β-form of the dyestuff as powder shows a very similar color in appearance to that of the α-form, but consists of finely formed crystal needles having a violet red color by transmitted light. When the β-form is incorporated in polyvinyl chloride, a foil is obtained which has a scarlet color by diffused reflected light and violet red color by transmitted light and has good migration fastness properties.

The X-ray diagrams of the α- and β-forms are different. Instead of ortho-dicholorobenzene, nitro-benzene, trichlorobenzene or α-chloronaphthalene may be used with good results.

*Example 2*

In a kneading machine with double tray of known construction from corrosion-resistant material, e.g. chrome-nickel steel, and cooled for example by circulating ice water and connected with a suitable ventilation system, 59.3 parts of 3,3'-dichloro-4,4'-di-(2''-hydroxy-3''-naphthoylamino)-1,1'-diphenyl are kneaded with a sufficient quantity of pyridine to obtain a good kneading consistency until a homogeneous kneading mass is obtained. The product, obtained from 25.5 parts of 1-amino-3-chlorobenzene by diazotizing and converting the diazo compound into the zinc chloride double salt and dried with partially dehydrated aluminum sulfate, is then added in small portions. In order to maintain the consistency of the kneading mass, more pyridine is added dropwise at the same time, so that the kneading mass remains coherent and as tough as possible. By intensive cooling of the kneading machine, care is taken that the internal temperature does not rise above 30° C. The diazo compound is taken up very quickly; the process can be easily observed by a spot test on filter paper, after triturating a test portion of the kneading mass with water, with a solution of sodium 2-hydroxy-naphthalene-3,6-disulfonate. Coupling is finished a few minutes after the last addition of diazo salt.

By slowly adding a little water the kneading mass is brought into a softer and more favorable form for working up and for emptying the kneading machine, and is then taken up in water. By hot extraction, first with dilute mineral acid and then with dilute sodium hydroxide solution, all foreign matter is removed from the pigment (pyridine, pyridine-hydrochloride, inorganic salts etc.). After drying at 90–100° C. in vacuo, a scarlet product is obtained which, when looked at under the microscope, consists of yellow-orange aggregates of up to about $2\mu$ diameter without recognizable crystalline form. When incorporated in polyvinyl chloride foils, strong orange tints are obtained which are of medium fastness to light.

By heating this orange pigment in, for example, ortho-dichlorobenzene, to about 140 to 170° C., conversion into a pigment crystallizing in long, pale red needles takes place rapidly, even in suspension, and can be easily followed in the microscope; heating with the organic solvent brings about at the same time an extensive improvement of the fastness to solvents and migration. The crystalline pigment dyes polyvinyl chloride foils in light-fast, scarlet tints and has a different X-ray spectrum from the orange colored coupling pigment.

In the above example any drying of the kneading mass, occurring during coupling and passing over into a powdery product which is no longer kneadable, is prevented by the addition of more pyridine; if, on the other hand, an attempt is made to maintain the kneading consistency by the addition of small quantities of water, a kneadable homogeneous mass is obtained again, it is true, but it has no inherent toughness. As a result, practically no more of the diazo compound is taken up and coupling cannot be completed. On the other hand, the kneading consistency can be maintained without disadvantages with neutrally reacting products which per se do not participate in the reaction, such as for example with glycols, alkyl ethers of mono- or diethylene glycol, diacetone alcohol, dimethyl formamide etc.

*Example 3*

In a kneading machine with double tray cooled with ice water 59.3 parts of 3,3'-dichloro-4,4'-di-(2''-hydroxy-3''-naphthoylamino)-1,1'-diphenyl and the quantity of pulverized caustic soda of 90–95% strength containing 8 parts of NaOH are kneaded with the necessary quantity of monobutyl ether of diethylene glycol to obtain a good kneading consistency. A homogeneous tough kneading mass is obtained in which the azo component is present partially or completely as naphtholate. During the addition of dry zinc chloride double salt of the diazo compound from 25.5 parts of 1-amino-3-chlorobenzene in small portions, the good kneading consistency is maintained by adding more monobutyl ether of diethylene glycol with constant circulation of ice water. By taking test portions it is possible to observe continuously how the diazo compound is taken up. Depending on the acidity of the diazo salt, a small quantity of pulverized caustic soda must be added in the course of coupling in order to maintain a neutral to weakly alkaline reaction to Brilliant Yellow until coupling is complete.

The reaction mixture is worked up as described in the preceding example and yields an identical, orange-coloring product. From the latter there is obtained by heating with ortho-dichlorobenzene the corresponding crystalline scarlet-coloring pigment.

The same results are obtained when an equimolecular quantity of caustic potash is used instead of caustic soda.

The replacement of the above monobutyl ether of diethylene glycol by similar diluents which have a neutral reaction and do not participate in the reaction, such as for example other ethers of diethylene glycol, ethylene glycol, polyethylene glycol, monoethyl ether of glycol, ortho-dichlorobenzene, dimethylformamide, does not have any influence either. If a diluent which is immiscible with water should be chosen, working up can be facilitated by extracting the kneading mass beforehand with an organic water-soluble product, such as for example ethanol.

Like in Example 2, the kneading consistency cannot be maintained during the course of the coupling by adding water, but only, for example, by compounds of the kind mentioned in the preceding paragraph and which are diluents suitable as kneading media.

*Example 4*

In a kneading machine with double tray cooled with ice water 59.3 parts of 3,3'-dichloro-4,4'-di-(2''-hydroxy-3''-naphthoylamino)-1,1'-diphenyl and 41 parts of pulverized, anhydrous sodium acetate are transformed into a homogeneous solid kneading mass with the necessary quantity of ortho-dichlorobenzene. The dry zinc chloride double salt of the diazo compound from 25.5 parts of 1-amino-3-chlorobenzene is slowly strewn in. By adding more ortho-dichlorobenzene, care is taken that a good kneading consistency is maintained, the acetic acid liberated during coupling partly acting as kneading medium.

The kneading mass can be worked up after coupling is complete in two different ways:

By successive extraction with alcohol, dilute mineral acid and dilute sodium hydroxide solution, followed by conversion in the hot of the orange modification, the same crystalline, scarlet pigment is obtained as is described in the preceding examples.

On the other hand, the change in the modification can be carried out by direct heating in the kneading machine or, after previous transfer from the kneading machine into another vessel, with or without dilution by additional ortho-dichlorobenzene, a product which is identical with the scarlet, crystalline pigment mentioned above being obtained, from which the accompanying foreign material can be removed subsequently by alcoholic and aqueous extraction.

The same results are obtained in this example when an equimolecular quantity of another alkali acetate or an alkali formiate is used instead of sodium acetate.

Other compounds which have a neutral reaction and do not participate in the reaction, such as a monoalkyl ether of diethylene glycol, monoethyl ether of glycol, diacetone alcohol, dimethyl formamide, can be used in the place of ortho-dichlorobenzene.

*Example 5*

In a kneading machine with double tray and cooled with circulating ice water 59.3 parts of 3,3'-dichloro-4,4'-di-(2''-hydroxy-3''-naphthoylamino)-1,1'-diphenyl and the dry zinc chloride double salt of the diazo compound from 25.5 parts of 1-amino-3-chlorobenzene are kneaded to a homogeneous mass with the necessary quantity of ethylene glycol. Finely pulverized caustic potash having a content of about 90 to 95% KOH is strewn in in very small portions so slowly that the reaction of a test portion diluted with water always remains very weakly alkaline to Brilliant Yellow. The consumption of caustic potash depends partly on the acidity of the diazo salt used. As coupling proceeds, the kneading consistency is maintained by the addition of more ethylene glycol. The kneading mass is worked up in the manner described in the preceding examples and leads to identical products.

The same results can be obtained if caustic soda is used instead of caustic potash. Ethylene glycol can also be replaced as coupling medium by similar compounds having a neutral reaction and not participating in the reaction, such as for example polyethylene glycols, dimethyl formamide, monoalkyl ether of diethylene glycol or monoethyl ether of glycol.

Example 6

In a kneading machine with double tray and cooled with circulating ice water 59.3 parts of 3,3'-dichloro-4,4'-di-(2''-hydroxy-3''-naphthoylamino)-1,1'-diphenyl and the quantity of pulverized caustic soda of 90-95% strength containing 8 parts of NaOH are kneaded to a yellow, faintly moist powder with the necessary quantity of water. The zinc chloride double salt of the diazo compound from 25.5 parts of 1-amino-3-chlorobenzene is then introduced in small portions. By further additions of pulverized caustic soda a weakly alkaline reaction to Brilliant Yellow is maintained. By adding small quantities of water, care is taken that the kneading mass always remains moist and powdery. In contrast to the preceding examples the diazo compound is taken up much more slowly, and finally a point is reached when coupling ceases.

If, in spite of this, the reaction mixture is worked up, there is obtained, after extracting the excess diazo compound with cold water and the other accompanying material with hot dilute mineral acid and hot dilute sodium hydroxide solution, a product which colors polyvinyl chloride foils orange similar to those described in the preceding examples. By heating it in ortho-dichlorobenzene, only a much smaller quantity of crystalline pigment (scarlet on polyvinyl chloride) can be obtained than is possible from the couplings in the presence of organic media.

The coupling is just as unsatisfactory in aqueous medium if, in place of caustic soda, other caustic alkalis are used. The same applies also for the coupling in the presence of excess alkali acetate or formiate, even when the temperature is raised to 50° C.

In the table below, further combinations are listed which, preferably according to one of the methods described in Examples 1 to 5, lead to products that in many cases give useful pigments of the stated shade only after a change of modification by heating in, for example, ortho-dichlorobenzene. The way in which the diazo compound is stabilized is only of importance inasmuch as the acidity of the diazo salt in all the couplings without excess pyridine influences the necessary quantity of caustic alkalis or of alkali acetates or formiates, and thus possibly also the consistency of the kneading mass (e.g. in cases in which organic acids are set free during coupling).

In coupling of diazo salts with azo components which only couple once, it goes without saying that equimolar quantities of diazo salt and azo component are used.

As the table shows, the coupling component is not limited in any other way than in being free from sulfonic acid groups, as according to the present process not only are pigments themselves produced, but also intermediate products for azo dyestuffs and pigments. By working up the coupling mixture in the appropriate way, account must be taken of the solubilities of the kneading medium and of the by-products and end-products.

| | Diazo salt | | Azo component | Shade in Polyvinyl chloride foil | |
|---|---|---|---|---|---|
| | Diazo component | Method of stabilization | | Crude product | Pigment from ortho-dichlorobenzene |
| 1 | 1-amino-3-chlorobenzene | zinc chloride double salt. | Terephthaloyl-diacetic acid di-(ortho-chloro-phenyl amide). | yellow | yellow. |
| 2 | 1-amino-2-chlorobenzene | do | do | greenish yellow | greenish yellow. |
| 3 | 1-amino-2-methyl-5-chloro-benzene | do | do | do | Do. |
| 4 | 1-amino-anthraquinone | sulfate | do | yellow | yellow. |
| 5 | 1-amino-3-chlorobenzene | zinc chloride double salt. | Terephthaloyl-diacetic acid di-(2,4-dimethoxy-5-chloro-phenyl amide). | do | Do. |
| 6 | do | do | Terephthaloyl-diacetic acid di-(2-methoxy-4-chloro-5-methyl phenyl amide). | greenish yellow | greenish yellow. |
| 7 | 1-amino-2-methyl-5-nitro-benzene. | naphthalene-1,5-disulfonic acid. | 3,3'-dichloro-4,4'-di-(2''-naphthoyl-amino)-1,1'-diphenyl. | orange | orange. |
| 8 | do | do | 4,4'-di-(2''-hydroxy-3''-naphthoyl-amino)-1,1'-diphenyl. | scarlet | scarlet. |
| 9 | do | do | 3,3'-dimethoxy-4,4'-di-(2''-hydroxy-3''-naphthoylamino)-1,1'-diphenyl. | orange brown | red brown. |
| 10 | 1-amino-3-chlorobenzene | zinc chloride double salt. | 4,4'-di-(2''-hydroxy-3''-naphthoyl-amino)-1,1''-diphenyl. | orange red | orange red. |
| 11 | 1-amino-2-methyl-5-chloro-benzene. | do | 3,3'-dichloro-4,4'-di-(2''-hydroxy-3''-naphthoyl-amino)-1,1'-diphenyl. | scarlet | scarlet. |
| 12 | 1-amino-2-methyl-3-chloro-benzene. | do | do | orange red | orange red. |
| 13 | do | do | 2-(2'-hydroxy-3'-naphthoylamino)-anthraquinone. | orange | orange. |
| 14 | 1-amino-2-chlorobenzene | do | 3-(2'-hydroxy-3'-naphthoylamino)-pyrene. | brown orange | brown orange. |
| 15 | 1-amino-2-methyl-4-chloro-benzene. | do | 4,4'-di-(2''-hydroxy-3''-naphthoylamino)-1,1'-diphenyl. | scarlet | scarlet. |
| 16 | do | do | 3,3'-dimethyl-4,4'-di-(2''-hydroxy-3''-naphthoyl-amino)-1,1-diphenyl. | violet red | violet red. |
| 17 | 1-amino-2-carboxylic acid methyl ester-5-chlorobenzene. | naphthalene-1-sulfonic acid. | do | brown orange | brown orange. |
| 18 | 1-amino-anthraquinone | sulfate | 4,4'-di-(2''-hydroxy-3''-naphthoylamino)-1,1'-diphenyl. | scarlet | red. |
| 19 | do | do | 1,5-di-(2'-hydroxy-3'-naphthoylamino)-naphthalene. | brown red | brown red. |
| 20 | 1-amino-2-methoxy-4-chloro-5-methylbenzene. | zinc chloride double salt. | 3,3'-dichloro-4,4'-di-(2''-hydroxy-3''-naphthoyl-amino)-1,1'-diphenyl. | bluish red | bluish red. |
| 21 | do | do | 2-(2'-hydroxy-3'-naphthoylamino)-chrysene. | violet | violet. |
| 22 | 1-amino-2-methyl-5-chloro-benzene. | do | 1-4-di-(N-methyl-2'-hydroxycarbazole-3'-carbazole-3'-carboylamino)-benzene. | red brown | brown. |
| 23 | 1-amino-2-methyl-4-chloro-benzene. | do | 1,4-di-(2'-hydroxycarbazole-3'-carboylamino)-benzene. | do | Do. |
| 24 | do | do | 1-(3'-hydroxydiphenylene-oxide-2'-carboylamino)-2,5-dimethoxybenzene. | yellowish brown | |
| 25 | do | do | 4,4'-di-(3''-hydroxydiphenylene-oxide-2''-carboylamino)-1,1'-diphenyl. | do | yellowish brown. |
| 26 | do | do | 4,4'-di-(2''-hydroxyfluorene-3''-carboylamino)-1,1'-diphenyl. | brown | brown. |
| 27 | 1-amino-3-chlorobenzene | do | 3-hydroxydiphenylene-oxide-2-carboxylic acid. | intermediate product | |
| 28 | 3-methoxy-4-amino-1,1'-diphenylamine. | hydrochloride | 4,4'-di-(2''-hydroxy-3''-naphthoyl-amino)-1,1'-diphenyl. | blue | blue. |
| 29 | 3-methoxy-4-amino-1,1'-diphenylamine. | do | 3,3'-dichloro-4,4'-di-(2''-hydroxy-3''-naphthoyl-amino)-1,1'-diphenyl. | reddish blue | reddish blue. |
| 30 | do | do | 3,3'-dimethyl-4,4'-di-(2''-hydroxy-3''-naphthoylamino)-1,1'-diphenyl. | navy blue | navy blue. |
| 31 | 1-amino-2-methoxy-5-nitro-benzene. | zinc chloride double salt. | 3,3'-dimethyl-4,4'-di-(2''-hydroxy-4''-methyl-1''-benzoylamino)-1,1'-diphenyl. | brown | dark brown. |

What is claimed is:
1. A process for the manufacture of an azo pigment from (a) a diazo compound which is free from sulfonic acid groups and is selected from the group consisting of diazobenzenes and diazoanthraquinones, and from (b) an azo component which is also free from sulfonic acid groups and contains from one to two groupings capable of coupling selected from acylacetylamine and ortho-hydroxyaryl carboxylic acid groupings, which comprises mechanically kneading and thereby coupling the diazo compound, in a stabilized dehydrated form, with the azo component under practically anhydrous conditions in substantially the minimum quantity of an organic solvent necessary to maintain a kneadable reaction batch.

2. A process for the manufacture of a disazo pigment from (a) a diazo compound which is free from sulfonic acid groups and is selected from the group consisting of diazobenzenes and diazoanthraquinones, and from (b) an azo component which is also free from sulfonic acid groups and contains two groupings capable of coupling selected from acylacetylamine and ortho-hydroxyaryl carboxylic acid groupings, which comprises mechanically kneading and thereby coupling the diazo compound, in a stabilized dehydrated form, with the azo component under practically anhydrous conditions in substantially the minimum quantity of an organic solvent necessary to maintain a kneadable reaction batch.

3. A process for the manufacture of an azo pigment, which comprises mechanically kneading and thereby coupling a diazo compound of the benzene series in a stabilized dehydrated form with a terephthaloyl-diacetic acid arylamide under practically anhydrous conditions in substantially the minimum quantity of an organic solvent necessary to maintain a kneadable reaction batch, both the diazo compound and the azo component being free from sulfonic acid groups.

4. A process according to claim 1, wherein the diazo compound is a diazobenzene zinc chloride double salt.

5. A process for the manufacture of an azo pigment, which comprises mechanically kneading and thereby coupling a diazo compound of the benzene series in a stabilized dehydrated form, with an azo component of the formula

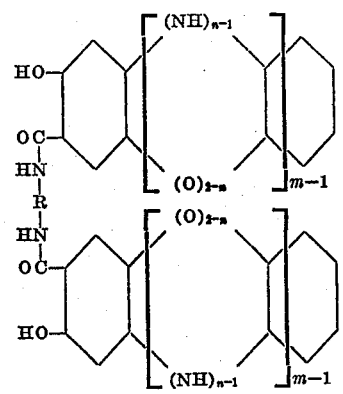

in which R represents a radical of the benzene series and m and n each represents a whole number of at the most 2, under practically anhydrous conditions in substantially the minimum quantity of an organic solvent necessary to maintain a kneadable reaction batch, both the diazo compound and the azo component being free from sulfonic acid groups.

6. A process for the manufacture of an azo pigment, which comprises mechanically kneading and thereby coupling two molecular proportions of the zinc chloride double salt of diazotized 1-amino-3-chlorobenzene with one molecular proportion of 3:3'-dichloro-4:4'-di-(2''-hydroxy-3''-naphthoylamino)-1:1'-diphenyl under practically anhydrous conditions in substantially the minimum quantity of pyridine necessary to maintain a kneadable reaction batch.

7. A process for the manufacture of an azo pigment, which comprises mechanically kneading and thereby coupling one molecular proportion of the zinc chloride double salt of diazotized 1-amino-2-methyl-3-chlorobenzene with one molecular proportion of 2-(2'-hydroxy-3'-naphthoylamino)-anthraquinone under practically anhydrous conditions in substantially the minimum quantity of pyridine necessary to maintain a kneadable reaction batch.

8. A process for the manufacture of an azo pigment, which comprises mechanically kneading and thereby coupling two molecular proportions of the zinc chloride double salt of diazotized 1-amino-2-methyl-4-chlorobenzene with one molecular proportion of 1:4-di-(2'-hydroxycarbazole-3'-carboylamino)-benzene under practically anhydrous conditions in substantially the minimum quantity of pyridine necessary to maintain a kneadable reaction batch.

9. A process for the manufacture of an azo pigment, which comprises mechanically kneading and thereby coupling two molecular proportions of the zinc chloride double salt of diazotized 1-amino-2-methyl-4-chlorobenzene with one molecular proportion of 4:4'-di-(3''-hydroxydiphenyleneoxide - 2'' - carboylamino) - 1:1' - diphenyl under practically anhydrous conditions in substantially the minimum quantity of pyridine necessary to maintain a kneadable reaction batch.

10. A process for the manufacture of an azo pigment, which comprises mechanically kneading and thereby coupling two molecular proportions of the hydrochloride of diazotized 3 - methoxy - 4 - amino - 1:1' - diphenylamine with one molecular proportion of 4:4'-di-(2''-hydroxy-3''-naphthoylamino)-1:1'-diphenyl under practically anhydrous conditions in substantially the minimum quantity of pyridine necessary to maintain a kneadable reaction batch.

References Cited in the file of this patent

UNITED STATES PATENTS

| | | |
|---|---|---|
| 2,012,096 | Conzetti | Aug. 20, 1935 |
| 2,222,733 | Ackermann | Nov. 26, 1940 |
| 2,249,956 | Heyna | July 22, 1941 |

OTHER REFERENCES

Saunders: The Aromatic Diazo Compounds, 2nd ed., p. 232 (1949).

Venkataraman, Synthetic Dyes, vol. 1, p. 427 (1952).

Groggins: Unit Processes in Organic Synthesis, 4th ed., pp. 137, 165, 166, 168, 169 (1952).